March 30, 1926.
L. ROSENSTEIN
1,578,850
PROCESS OF REMOVING TRACES OF CHLORINE FROM AIR
Original Filed April 19, 1923.
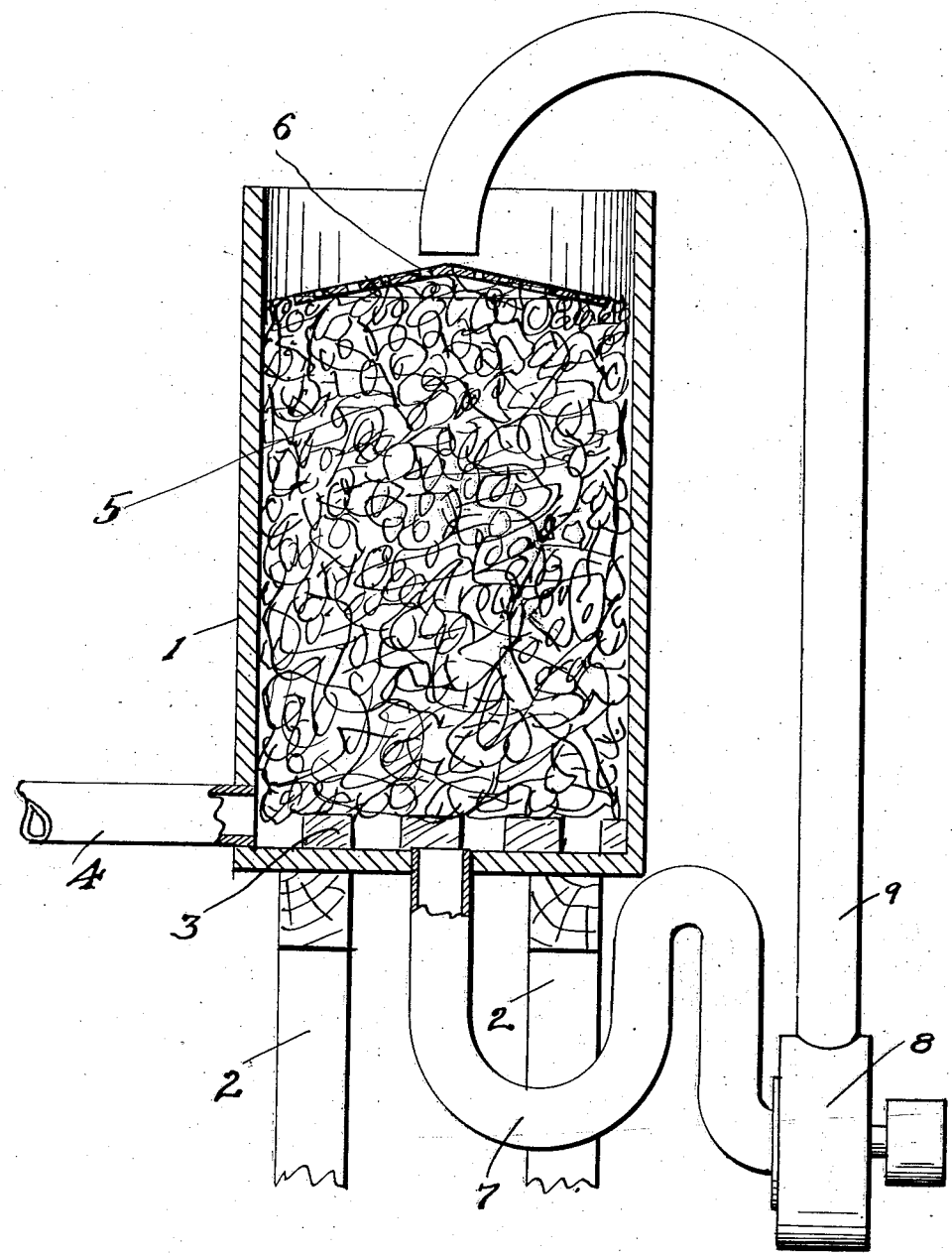
INVENTOR
Ludwig Rosenstein
By
Carlos P. Griffin
ATTORNEY Patented Mar. 30, 1926.

1,578,850

UNITED STATES PATENT OFFICE.

LUDWIG ROSENSTEIN, OF SAN FRANCISCO, CALIFORNIA.

PROCESS OF REMOVING TRACES OF CHLORINE FROM AIR.

Application filed April 19, 1923, Serial No. 633,254. Renewed August 31, 1925.

*To all whom it may concern:*

Be it known that I, LUDWIG ROSENSTEIN, a citizen of the United States, residing at San Francisco, in the county of San Francisco, State of California, have invented a new and useful Process of Removing Traces of Chlorine from Air, of which the following is a specification in such full and clear terms as will enable those skilled in the art to construct and use the same.

This invention relates to a process of removing waste chlorine from the air or other gases carrying it. It will be understood by those skilled in the art that in many mechanical processes chlorine gas is passed through suitable apparatus for the purpose of carrying on chemical reaction and in many of these cases the resultant waste product carries sufficient small traces of chlorine to prevent that waste product from being exhausted into the atmosphere because of the deleterious nature of even the small percentage of chlorine carried.

In order to produce a waste product that will not be objectionable, some means to remove every trace of free chlorine from the waste product must be made use of, and the present invention removes that small trace of chlorine, leaving a waste product that is unobjectionable to surrounding neighbors.

In the drawing there is illustrated a diagrammatical view, partly in vertical section, showing the apparatus capable of carrying out the process in which the same numerals are applied to the same portion throughout.

In the diagrammatical illustration of the apparatus for carrying out this process, the numeral 1 indicates a stack made of suitable material, capable of withstanding the corrosive action of the chlorine which has supports (3) at its bottom and it is mounted upon other supports (2).

A pipe (4) admits the chlorine laden gases to the stack and they pass upwardly through a mass of scrap iron (5) mounted on supports (3).

At the top of the stack there are some tiles (6) to distribute the solution evenly over the mass of scrap iron in the stack.

A pipe (7) at the bottom of the stack leads to a suitable pump (8) which pump in turn delivers the solution out through pipe (9) to the top of the stack where it is spread over a mass of scrap iron and is again ready for the pump.

The discovery herein involved lies in the affinity of the minute quantity of chlorine gas for iron when in the presence of ferrous chloride solution.

The reaction involved is obscure, but probably includes an addition of chlorine to the ferrous chloride to produce ferric chloride, followed by a further reaction to produce ferrous chloride solution, there being very little or no ferric chloride present by test at any time.

The advantage of this process is that it will continue indefinitely by merely adding scrap iron to the stack and withdrawing the ferrous chloride solution from time to time, as it may become too concentrated.

A further advantage of this process lies in the fact that the product of the process is a salable product when removed from the apparatus used to carry out this process evaporated and further chlorinated to the form of solid ferric chloride or its concentrated solution.

With this process substantially every trace of free chloride is removed from the air and other gases which may be carrying it.

It will be understood that while ferrous chloride solution has been found the most advantageous, the invention may also be carried out by passing water, dilute hydrochloric acid, or ferric chloride solution, all of which will after a short time form ferrous chloride in solution over the scrap iron.

The advantage of this process is that it is a continuously regenerative process, in that the end product formed is the material necessary to start and continue the reaction in the presence of iron, and the reaction proceeds so strongly that minute quantities of chlorine are completely absorbed.

What I claim as new and desire to secure by Letters Patent of the United States is as follows, but I am aware that there may be modifications of the process within the purview of the appended claim:

A process of removing traces of chlorine from gases which comprises passing the gas to be treated over a body of scrap iron and keeping said body of iron wet with a ferrous chloride solution during the passage of the gas.

In testimony whereof I have hereunto set my hand this 14th day of April, A. D. 1923.

LUDWIG ROSENSTEIN.